(12) United States Patent
Wintring et al.

(10) Patent No.: US 8,783,000 B2
(45) Date of Patent: Jul. 22, 2014

(54) ROTATING BUCKET FOR PRODUCT HANDLING APPARATUS

(75) Inventors: Jeffrey D. Wintring, Florence, KY (US); R. Todd Gatman, Burlington, KY (US)

(73) Assignee: R. A. Jones & Co. Inc., Covington, KY (US)

(*) Notice: Subject to any disclaimer, the term of this patent is extended or adjusted under 35 U.S.C. 154(b) by 238 days.

(21) Appl. No.: 12/567,015

(22) Filed: Sep. 25, 2009

(65) Prior Publication Data

US 2010/0077705 A1    Apr. 1, 2010

Related U.S. Application Data

(60) Provisional application No. 61/194,285, filed on Sep. 26, 2008.

(51) Int. Cl.
*B65B 5/06* (2006.01)
*B65G 47/244* (2006.01)

(52) U.S. Cl.
USPC .................. 53/249; 53/202; 53/235; 53/250; 53/251; 53/253

(58) Field of Classification Search
USPC ................. 198/375, 377.2, 703, 706, 377.02, 198/377.1, 701; 53/202, 249–251, 253, 53/255, 566, 235
See application file for complete search history.

(56) References Cited

U.S. PATENT DOCUMENTS

| | | | | |
|---|---|---|---|---|
| 4,483,526 A * | 11/1984 | Bulka et al. | ............ | 198/377.07 |
| 5,072,573 A * | 12/1991 | Tisma | ............ | 53/252 |
| 5,105,933 A * | 4/1992 | Gough | ............ | 198/706 |
| 5,435,429 A * | 7/1995 | Van Den Goor | ............ | 198/890.1 |
| 5,535,999 A * | 7/1996 | Ford | ............ | 271/185 |
| 5,579,890 A * | 12/1996 | Harris | ............ | 198/377.1 |
| 6,202,392 B1 * | 3/2001 | Greenwell et al. | ............ | 53/566 |
| 6,273,237 B1 * | 8/2001 | Bazydola et al. | ............ | 198/375 |
| 6,374,997 B1 * | 4/2002 | Spadafora et al. | ............ | 198/803.11 |
| 6,390,276 B1 * | 5/2002 | Haug et al. | ............ | 198/377.01 |
| 6,435,332 B1 * | 8/2002 | Price | ............ | 198/375 |
| 6,520,314 B1 * | 2/2003 | Seiling | ............ | 198/375 |
| 6,698,163 B2 * | 3/2004 | Greenwell et al. | ............ | 53/429 |

* cited by examiner

*Primary Examiner* — Hemant M Desai
*Assistant Examiner* — Gloria R Weeks
(74) *Attorney, Agent, or Firm* — Wood, Herron & Evans, LLP

(57) ABSTRACT

Improved product handling and transfer apparatus includes rotatable product buckets for receiving product and re-orienting product for packaging in diverse configurations or containers. Buckets preferably include channels spanned by deposited product or receiving product therein, with bucket turning as appropriate to a packaging configuration. Flat bottom buckets and methods are disclosed.

23 Claims, 9 Drawing Sheets

US 8,783,000 B2

ROTATING BUCKET FOR PRODUCT HANDLING APPARATUS

RELATED APPLICATIONS

Applicant claims the benefit of the priority of the filing date of Sep. 26, 2008 of applicant's provisional patent application U.S. Ser. No. 61/194,285, entitled "ROTATING BUCKET FOR PRODUCT HANDLING APPARATUS", which application is expressly incorporated herein by reference as if fully and expressly set out herein.

FIELD OF THE INVENTION

This invention relates to transferring, conveying or handling items and more particularly to a product conveyor.

BACKGROUND OF THE INVENTION

It has been known to rotate products in a process or packaging line by rotating the product carried by a conveyor. The following disclosures illustrate such prior systems: U.S. Pat. Nos. 6,202,392; 6,435,332; 6,698,163 and EP 1 801 014 A1, copies of which are attached and each of which is incorporated herein by reference. As one example of a product handling device, products are turned relative to and while on a supporting device like a product bucket. In such an exemplary device, facial tissues are produced in select count stacks or clips comprising one flat tissue lying atop another in an elongated flat shaped stack being generally longer than it is wide. Such clips are then packaged in various cartons and supplied to consumers.

There are two primary designs for tissue packaging generally used in the industry. One type of carton is referred to as "flats" and is generally rectangular. For flat cartons, the clip is simply pushed endwise from a cartoner bucket into the box. Typically, the box has at least one major panel generally parallel with the tissues and an opening in the panel provides access for tissue removal for use. Another type of carton is referred to as "cubes" or "boutiques" and is more square or boxlike than the rectangular cartons of flats. This type of carton is more confining and the clips must be bent into a U-shape and, thusly configured, pushed sideways into the boutique carton. In a similar manner, a major panel adjacent the bend in the confined clip is provided with an opening for accessing the tissues for withdrawal and use.

To provide packaging in both a flat carton and a boutique carton, manufacturers typically have two options. One option is for the manufacturer to have two cartoning machines wherein one would handle a flat carton and the other would handle a boutique carton. This approach, however, involves the additional cost of an extra machine. A second option is to use a single machine capable of packaging one type of carton and being further capable of packaging the second type of carton upon reconfiguration. In this case, the machine would be stopped and many changeover parts added/removed to reconfigure the machine to render it operable for properly configuring the clip for the new carton. Such a process, however, results in production downtime and significant expense for changeover parts.

More recently, there have been some devices capable of packaging tissue in either a flat carton or boutique carton in an improved manner without extensive downtime and with a fewer number of changeover parts. One such device and system is described in U.S. Pat. No. 6,202,392 (the '392 patent), which patent is expressly incorporated herein by reference as if fully expressly reproduced herein. In that device, a tissue handling apparatus includes a bucket conveyor having a plurality of buckets wherein each bucket includes a floor having a transverse or laterally extending or directed channel. The buckets are oriented such that the transverse channel extends substantially perpendicular to the machine direction of the buckets along the bucket conveyor. All clips of whatever final configuration are fed into the buckets with their elongated length oriented in a downstream direction parallel to the machine direction of the buckets so that the longer clips span over the narrower transverse channel in their respective buckets.

When it is desired to fill a boutique carton, the clip is maintained in its original position spanning the channel, its length being longer than the channel is wide. A tamp or confiner is moved in over the clip and pushes an intermediate portion of the clip down into the channel into a U-shaped configuration with a central portion of the clip at least partially down in the channel and the outer ends contacted by the bucket floor or the channel walls and being directed upwardly. From this position, the U-shaped clip may now be pushed transversely and sideways out of the bucket and into a boutique carton. When it is desired to fill flat cartons, however, the clip is turned on and with respect to the bucket so that it extends across the bucket and parallel to the transverse channel. This turning causes the flat clip to fall into the transverse channel. From there, it can then be pushed transversely and endwise into a flat carton.

In order to turn and drop the clip and maintain it in appropriate alignment at the same time, the handling apparatus includes two offset opposed pushers engaging side edges of the flat clip at offset longitudinal positions to carefully turn the clip and allow the clip to drop into the channel. In essence, with the bucket remaining rotationally stationary, the pushers rotate the clip relative to the bucket to position the clip in the transverse channel. The pushers may comprise plates extendable transversely into the buckets from opposite sides and into and above the transverse channels. Ends of the pushers engage and twist or turn the clip. Once in alignment with the channel, the clips are aligned with internal facing sides of the pushers which configure and guide the clip through its fall into the channel.

Thereafter, the pushers are retracted and the clips are conveyed downstream to a cartoner where they can be pushed endwise transversely across the buckets along the channels and into a flat carton. The pushers are carried on a barrel loader-like apparatus disposed on opposite sides of the bucket conveyor and are either stopped or disabled when it is desired to configure the clips for loading boutique cartons where the clips are not turned. No change parts are required for selectively turning or not turning the clips.

In another form of a prior approach to tissue clip handling, a product support has a flat bottom. The tissue clips resting on that surface are turned on that surface and relative to that surface. Such a device is shown in EP 1 801 014 A1, incorporated herein.

Manufacturers continually strive to improve the packaging process, making the packaging of tissue and other items more efficient and cost effective. For example, the device described in the '392 patent includes a relatively large number of parts dedicated to turning the clips relative to the buckets when packaging flats. These parts require regular maintenance and/or replacement. That device further includes an increased length of the bucket conveyor so as to accommodate the pushers and turning of the clips in their respective buckets along the conveyor. This in turn leads to an increased number of buckets, an overall larger machine footprint and associated costs. The relatively larger machine footprint may present challenges due to space constraints and may mandate a more complex line layout, which further increases costs.

Moreover, in the device of EP 1801014 A1, there is no provision for selective orientation of tissue clips in different packaging configurations.

Accordingly, it has been one objective of the invention to provide a single, improved product handling apparatus and methods for selectively turning products and presenting them in different orientations as they move through a processing or packaging line.

It has been a further objective of the invention to provide improved apparatus and methods for transferring products such as tissue clips for proper orientation for insertion into flat cartons and for selective transferring of tissue clips for loading into boutique cartons.

It has been a further objective of the invention to provide improved apparatus and methods for handling differently configured products on the same handling apparatus having a reduced number of parts and accommodating varied orientation of the products with a reduced machine footprint.

SUMMARY OF THE INVENTION

To these ends, one embodiment of the invention contemplates a tissue handling apparatus and methods wherein the buckets carried by a bucket conveyor are selectively rotatable relative to the bucket conveyor, depending on the type and orientation of product being handling or carton being filled. The buckets of this embodiment have a similar construction as that described in the '392 patent and in one embodiment include a floor and a transverse channel disposed in the floor. However, unlike the buckets of the '392 patents, buckets described herein are rotatable to provide a variety of operational functions. According to this embodiment, all clips of whatever final configuration they may assume, are to the rotatable buckets with their elongated length preferably oriented in a downstream direction parallel to the machine direction of the buckets moving along the bucket conveyor. The buckets may be selectively rotatable so as to receive then orient the transferred clips in an orientation appropriate for the type of carton being filled.

The buckets have a first, default orientation or position as that described in the '392 patent, i.e., wherein the elongated transverse channel extends in a direction substantially perpendicular to the machine direction of the buckets. In the first position, the buckets are oriented for transferring for receiving and packaging clips in a boutique carton. To this end, the tissue clips are placed in the buckets so as to span over the transverse channel in their respective buckets. A tamp or confiner is moved in over the clip and pushes an intermediate portion of the clip down into the channel into a U-shaped configuration. The U-shaped clip is then pushed transversely and sideways out of the bucket and into a boutique carton. In this way, the handling apparatus of the present invention operates in a manner similar to that described in the '392 patent for the packaging of tissue clips in boutique cartons.

In an advantageous aspect of the invention, the buckets are selectively rotatable to a second orientation or position wherein the elongated transverse channel extends substantially parallel to the machine direction of the buckets moving along the bucket conveyor. The ability to rotate the buckets between the first and second positions facilitates packaging clips in a flat carton. To this end, the buckets may be rotated away from the first position and to the second position prior to receiving the clips therein. With the buckets in the second position, the transverse channel now extends substantially parallel to the machine direction and the clips are fed or placed directly within the transverse channel. Once the clips are deposited within the transverse channel, the buckets may be rotated from the second position back to the first position, i.e., with the transverse channel substantially perpendicular to the machine direction. As explained in the '392 patent, with the buckets in the first position and the tissue clips properly positioned within the transverse channel, the clips may be pushed endwise into a flat carton. The buckets may be rotated from the first position back to the second position prior to receiving another clip.

This embodiment of the invention effectively eliminates the pushers and other mechanisms that turn the tissue clips relative to the buckets so as to deposit the clips in the transverse channel when packaging flats. In this embodiment, the buckets rotate to a second position relative to the bucket conveyor and the bucket supports so as to directly receive the clips in the transverse channel, and then rotate back again to the first position to be in the proper orientation to push the clips into the flat cartons. Because the turning of the clips is accomplished by turning the buckets relative to the bucket conveyor instead of turning the clips relative to the buckets, as in the '392 patent, many of the parts dedicated to turning the clips in the device of the '392 patent may be effectively eliminated. This reduces the costs associated with maintaining those aspects of the device. Moreover, eliminating the parts that turn the clips further reduce the length of the bucket conveyor, reduce the number of buckets on the bucket conveyor and reduce the overall machine footprint.

Accordingly, the embodiment of the invention provides a flexible, dual function improved tissue handling apparatus for easily configuring tissue clips for flat or boutique cartoning.

In another embodiment of this invention, the product buckets have a relatively flat floor or product supporting surface. In other respects, the buckets and the structure facilitating their rotation are the same as in the first embodiment described above. For boutique packaging, intermediate guides alongside the bucket conveyor may be used to configure the side-pushed clips for their boutique packages.

Accordingly, products including tissue clips as described above, or a variety of other products, are deposited on the flat bucket floor and the buckets are pre-turned or are later rotated to achieve the proper or desired product orientation for further processing, packaging or the like.

It will be appreciated that this embodiment includes a rotating bucket not limited to a bucket with a transverse channel in its floor, for either tissue clip handling and packaging or for a wide variety of other forms and applications or products where product rotation is desired. Such second embodiment thus provides both for tissue clip and other product handling similar advantages as in the embodiment first described above.

These and other objectives and results will be readily appreciated by those of ordinary skill in the art from the following detailed description of a preferred embodiment of the invention and from the drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

The present invention is an improvement and alternative to the tissue handling apparatus described in the '392 patent, which patent is expressly incorporated herein by reference as if fully expressly reproduced herein. While this invention has multiple applications, one particular application is in a flat/boutique tissue clip transfer and package operation similar to that described in U.S. Pat. No. 6,202,392 ('392) and reference to that disclosure is made herein for environment of use hereof. That patent discloses a tissue handling apparatus capable of selectively rotating a clip relative to the bucket to position the clip in a transverse channel for packaging in a flat carton. For a boutique carton, the clip does not require rotation. The present application discloses in one embodiment an alternate manner in which to rotate the clip for packaging the clip in a flat carton. In particular, instead of rotating the clip relative to the bucket when desiring to package a clip in a flat carton, the entire bucket is rotated relative to the bucket conveyor to orient the bucket to receive the clip and rotated again to orient the bucket so as to push the clip into the box.

Figure 1:
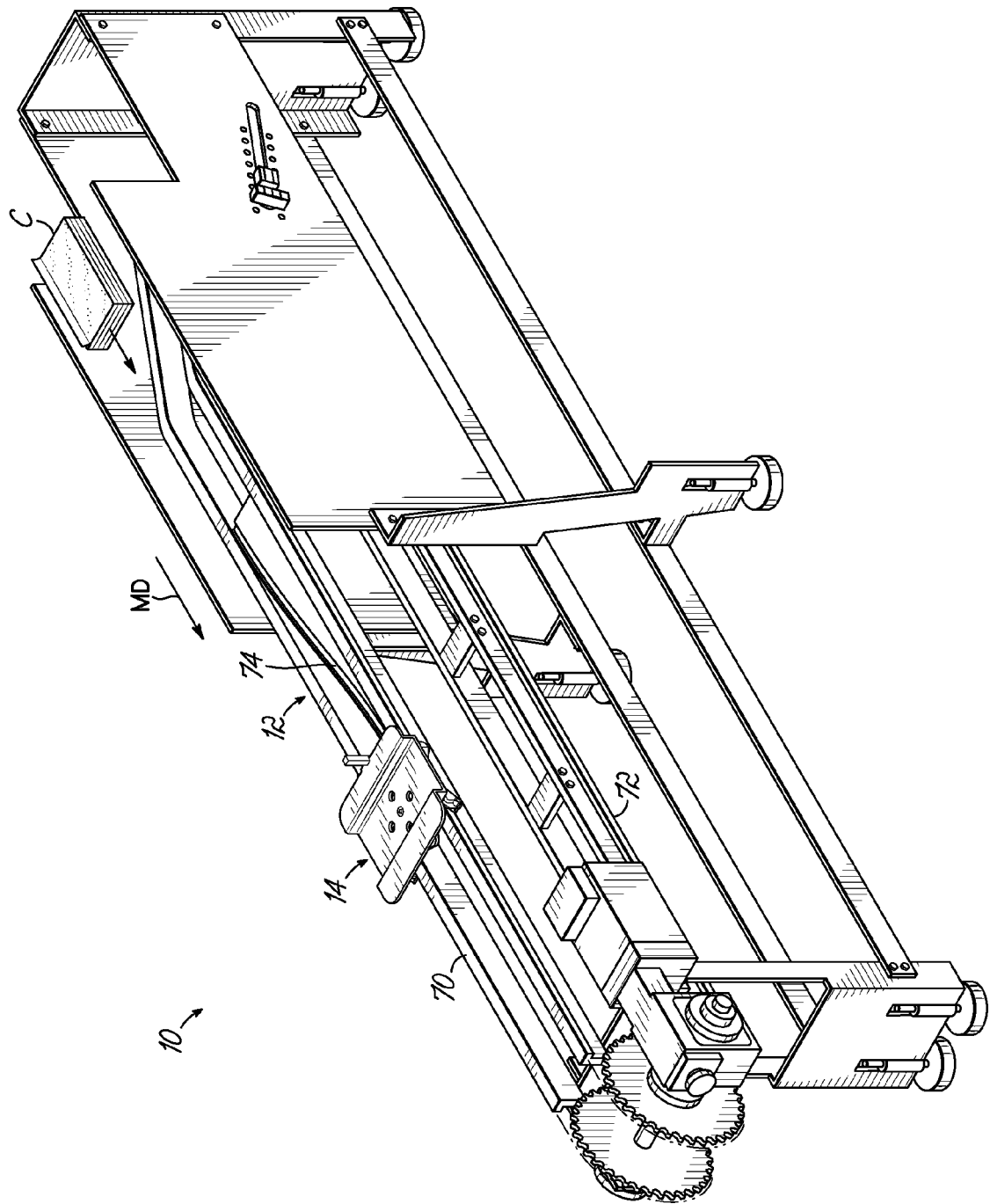
FIG. 1 is a perspective view of a tissue handling apparatus in accordance with the invention.
Figure 2:
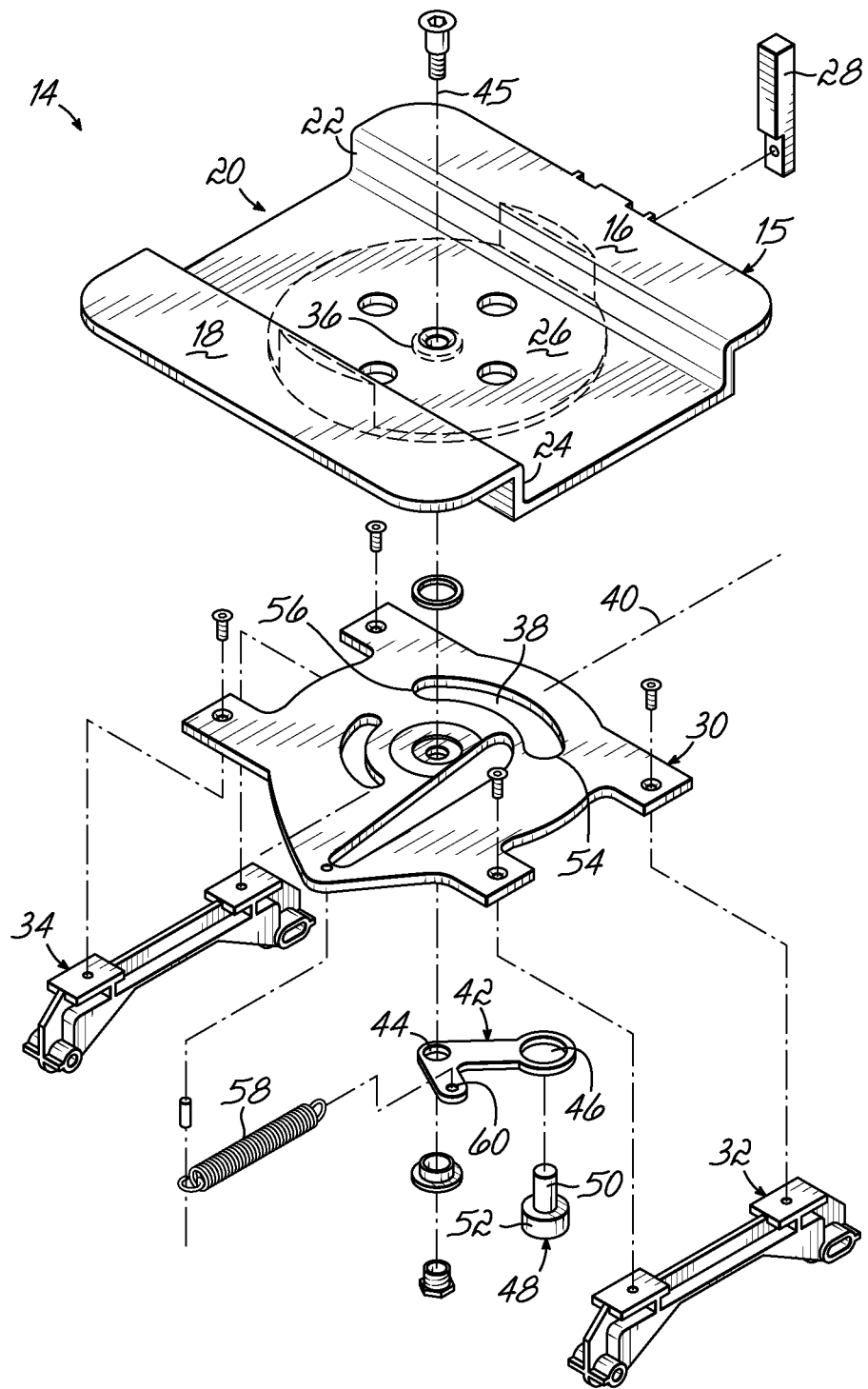
FIG. 2 is a perspective disassembled view of a rotatable bucket in accordance with the invention.

As many of the figures shown in the '392 patent show features that also apply to the handling apparatus of the present invention, this specification makes reference to some of those figures to explain background of the present invention. FIGS. 1 and 2 of the '392 patent illustrate the orientation of the clips of facial tissue both in a respective boutique clip configuration and in a flat clip configuration. In the tissue handling apparatus of the invention, this aspect has not changed and that description also describes the orientation of the clips in the present invention. Thus as shown in FIG. 1 of the '392 patent, an upright cubic or boutique carton has a tissue opening in a major panel which is situated on the bottom of the carton as shown in that figure. A boutique clip is illustrated in its boutique configuration such that the clip itself takes on a bent or U-shaped configuration for loading into the carton.

It will be appreciated that the clip has a width and a foreshortened length from end-to-end due to the bending of the tissues in the clip, but generally running from the narrow edge of one tissue through the clip to its narrow opposed and parallel edge. Such a clip is inserted into the carton by means of a longitudinal U-shaped pusher moving in a load direction through an inclined guide bracket as is described in the '392 patent. The clips are preferably loaded on the move while they are being transported in a downstream or machine direction (MD) with the cartons and the pusher moving in the same downstream direction at the same time such that the pusher is also moving transversely in the load direction to push the clips into the carton.

A carton of flat shape or configuration is shown in FIG. 2 of the '392 patent. The carton is also provided with a tissue opening disposed in a major bottom panel of the carton. A flat clip comprising a plurality of facial tissues has narrow ends, each defining across them a width, and the clip is elongated between the ends, defining a length. A U-shaped pusher is moved in a load direction to push the flat clip endwise and transversely into the carton. This is accomplished while the clip, the carton and the pusher are also moving in a downstream direction.

It will be appreciated, as shown in FIGS. 1 and 2 of the '392 patent that the cartons are conveyed in a downstream direction by a carton conveyor, such as a lug type conveyor, while the pushers are conveyed sequentially in a downstream direction, one after the other, by means of a well known barrel loader which is useful to convey the pushers in a downstream or machine direction while, at the same time, causing the pushers to extend transversely to load the clips into the cartons respectively.

At the same time, the clips are carried in the separate buckets of a bucket conveyor in the machine direction. As will be described, the clips are pushed from these buckets transversely through transfer guide buckets and into the cartons.

Figure 3:
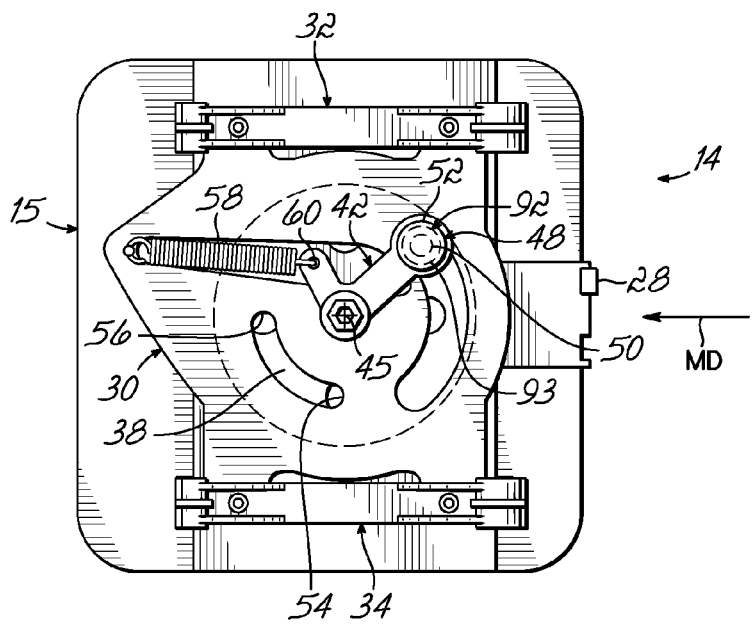
FIG. 3 is a bottom plan view of an assembled rotatable bucket.

For illustration purposes, a complete system for loading individual clips which are discharged in any conventional manner, such as from a log saw, is illustrated in FIG. 3 of the '392 patent. A similar system may be used for loading individual clips in the present invention. Any modifications of the system shown in FIG. 3 of the '392 patent in regard to the present invention will be appropriately noted. The system shown in FIG. 3 of the '392 patent includes a log saw discharging clips onto a clip conveyor from where the clips are introduced into a spacing apparatus including a turnwheel having depending clip pushing pins for engaging the rear end of the clips and moving the clips in a curved path, as shown in this embodiment as a 90 degree turn, into a clip handling apparatus. While the length of the line in previous systems often mandated a line layout having a turn, and thus a turnwheel, in the present invention, it is contemplated that the turnwheel may be completely eliminated and the clips on the clip conveyor may be fed directly into the clip handling apparatus of the invention without such a turn. Those of ordinary skill in the art should appreciate, however, that the clip handling apparatus of the invention may be used with such a turnwheel. When there is no turnwheel, those of ordinary skill in the art should also appreciate that a smart belt system, as is known in the art, may be used to time the clips on the clip conveyor with the buckets on the bucket conveyor. Also, clips can be fed end-wise to the buckets herein, but in a transverse direction perpendicular to the machine direction of the bucket conveyor, with appropriate bucket rotation depending on the desired transfer orientation of the clip.

When the clips are discharged from the wheel, they are deposited into buckets on a bucket conveyor. The clips can be deposited on the bucket conveyor in any further known fashion and by any apparatus which does not comprise a part of this particular invention. The clips may be fed onto the ends of the buckets or pushed onto them in that manner, or may be fed from an overhead position and dropped into the buckets. In any event, it will be appreciated that, at this point, all of the clips, whether to be formed in a boutique configuration or in a flat configuration are, in fact, flat and elongated in these and other feed configurations, in a machine direction as they reside on the buckets of the bucket conveyor at this position.

The clips are conveyed in the buckets to a cartoning apparatus for moving the clips from the full bucket conveyors into respective cartons. This cartoner includes carton feeding and erecting apparatus, a carton conveyor, a transfer guide bucket conveyor and downstream carton handling apparatus including dust flap closing, gluing, flap closing, compression and other conveying apparatus for finishing the carton and feeding it to a product discharge end of the cartoner, where the respective cartons either of the boutique style or the flat style are discharged for packaging and shipment. The cartoner includes a barrel loader of typical configuration including a cam track for moving pushers to load cartons as will be described. Also, at the cartoner, a carousel is disposed above the bucket conveyor and transfer guide conveyor as is described in the '392 patent.

Figure 4:
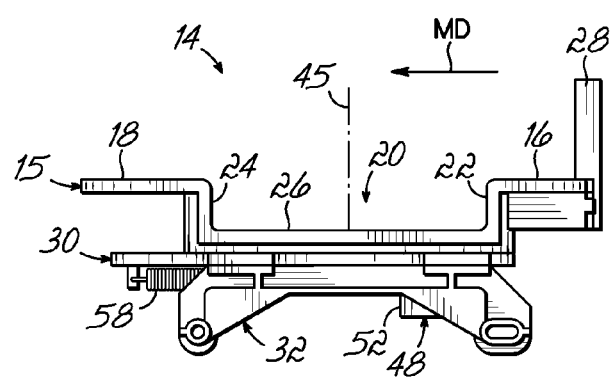
FIG. 4 is a side elevation view of the bucket shown in FIG. 3.

The handling apparatus in the '392 patent is configured to selectively rotate the clips if packaging in a flat carton is desired. As shown in FIG. 4 of the '392 patent, the rotation of the clips is accomplished with a pair of offset pushers that engage the edges of the clip to rotate the clip relative to the bucket so as to position the clip within a transverse channel in the bucket. That handling apparatus in the '392 patent is replaced with the handling apparatus 10 best seen in FIG. 1 of the present application.

Turning now to FIG. 1 herein, it will be appreciated that a plurality of clips is sequentially transported by a bucket conveyor 12 having a plurality of buckets 14 (one shown in FIG. 1). While the description of the invention refers to a specific embodiment of buckets 14 for receiving the tissue clips, those of ordinary skill in the art will recognize that the buckets may be configured as other frame members, positioning rails or other mechanical forms adapted to receive the tissue clips. At this point, it will be instructive to note that upon entering handling apparatus 10, the clips C are all preferably elongated and in a flat configuration, having a longitudinal dimension moving in the same direction and in parallel with the machine direction MD of the bucket conveyor 12.

Turning now momentarily to FIGS. 2-5 of the present application, one embodiment of the individual buckets 14 of the bucket conveyor 12 will be described. The configuration of the individual buckets 14 are somewhat similar to that disclosed in the '392 patent in that they include a bucket portion or product receiving member 15 having a bucket floor comprising a rearward transverse floor surface 16 and a forward transverse floor surface 18 in a common horizontal plane. A transverse channel 20 is disposed in the floor defined by surfaces 16, 18 and comprises channel walls 22, 24 and channel floor 26. Channel floor 26 is depressed or lower than the floor surfaces 16, 18 of the product receiving member bucket portion 15. Each bucket 14 is provided with a clip pusher 28 extending above the floor surface 16 at the trailing edge of the bucket 14.

Figure 5:
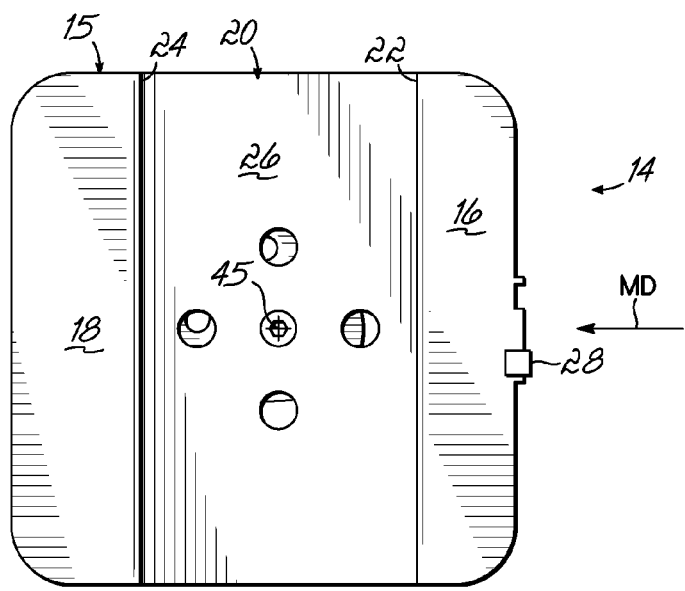
FIG. 5 is a top plan view of the bucket shown in FIG. 3.

The buckets 14, however, further include a bucket member support 30 mounted on two carrying brackets 32, 34 which are provided with provisions for securing the bucket support 30 to parallel conveyor chains (shown in dotted lines in FIG. 7) which comprise the bucket conveyor 12 (see also FIG. 5 of the '392 patent). Each of the individual buckets 14 is centered on the chains at a desired pitch of, for example, twelve inches. Bucket portion 15 is rotatably coupled to bucket support 30 via a suitable bearing 36 (see FIGS. 14-15). In this way, bucket portion 15 is capable of rotating relative to bucket support 30 and therefore relative to bucket conveyor 12.

The bucket 14 further includes a rotational limit mechanism that limits the range of rotation of the bucket portion 15 relative to the bucket support 30 between a first position wherein the transverse slot 20 is substantially perpendicular to the machine direction MD of the buckets 14 on bucket conveyor 12, and a second position wherein the transverse slot 20 is substantially parallel to the machine direction MD of the buckets 14 on bucket conveyor 12. To this end, the bucket support 30 includes an arcuate slot 38 adjacent a rear edge of bucket support 30 and is symmetric about a centerline 40 (FIG. 2) parallel to the machine direction. Details of the apparatus rotationally mounting the bucket and limiting that rotation are vest seen in FIGS. 2-5A.

Figure 5A:
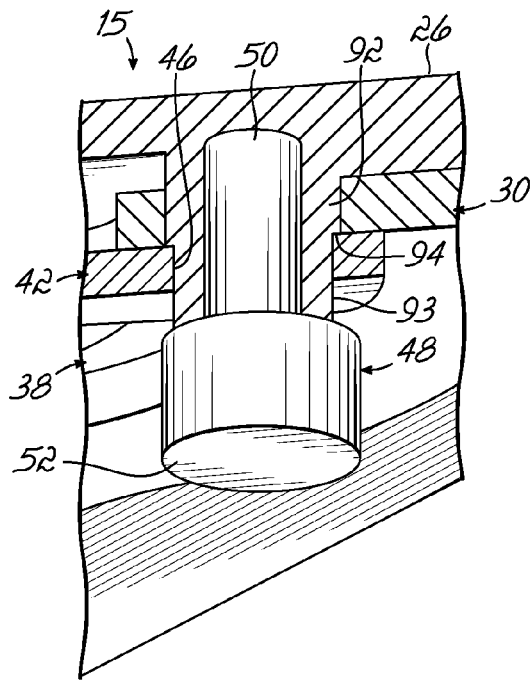
FIG. 5A is a perspective sectional bottom view of a portion of the bucket turning apparatus of the invention in FIGS. 2-5.

The bucket 14 further includes a V-shaped actuating lever 42 positioned on the underside of the bucket support 30. Lever 42 includes an aperture 44 for rotationally supporting the lever 42 at the pivot axis 45 of the bucket portion 15. When lever 42 is rotated relative to bucket support 30, bucket portion 15 also rotates with lever 42 and relative to bucket support 30. The V-shaped lever 42 further includes a second aperture 46 at the end of one leg having a length such that the aperture 46 aligns with the slot 38 in bucket support 30. Preferably, in this embodiment, bucket portion 15 is provided with a boss 92 depending from channel floor 26 (FIG. 5A). Boss 92 defines a shoulder 94 bottoming out on arm 42, boss 92 extending through and captured in slot 38.

A cam follower 48 depends from pin 50 extending upwardly into and fixed in boss 92. A lower reduced diameter portion 93 o boss 92 is captured in aperture 46 of arm 42 and cooperates with bucket conveyor 12 to rotate the bucket portion 15 between the first and second positions, as explained in more detail below.

Pin 50 of cam follower 48 projects into the boss 92 captured in arcuate slot 38. An outer cam bearing surface 52 projects below bucket support 30 for applying a force to rotate the bucket portion 15 when urged by a cam. The boss 92 and arcuate slot 38 cooperate to limit movement of the bucket portion 15 relative to bucket support 30. In particular, when the bucket portion 15 is in the first position, i.e., the transverse channel 20 is substantially perpendicular to the machine direction of the buckets 14 along bucket conveyor 12, the boss 92 engages or approaches a first end 54 of arcuate slot 38. In a similar manner, when the bucket portion 15 is in the second position, i.e., the transverse channel 20 is substantially parallel to the machine direction of the buckets 14 along bucket conveyor 12, the boss 92 engages or approaches a second end 56 of arcuate slot 38. Looking from a top plan view of the bucket 14, the bucket portion 15 moves from the first position to the second position through a counter clockwise rotation of the bucket portion 15 and from the second position to the first position through a clockwise rotation of the bucket portion 15.

In addition to the limited rotation of the bucket portion 15 relative to bucket support 30 noted above, the bucket portion 15 may be biased relative to bucket support 30 toward, for instance, the first position. To this end, bucket 14 includes a biasing member, such as coil spring 58. One end of coil spring 58 is coupled to bucket support 30 and the other end of coil spring 58 is coupled to the second leg of the V-shaped actuating lever 42. For instance, the second leg may include a suitable aperture 60 for coupling an end of the coil spring 58. In the configuration shown in the figures, the coil spring 58 applies a restoring force that resists movement of the bucket portion 15 away from the first position. In this way, the first position is a default position such that without the application of a suitable force, the transverse channel 20 will be substantially perpendicular to the machine direction of the buckets 14 along bucket conveyor 12. Upon application of a sufficient cam force that overcomes the restoring force of the coil spring 58, the bucket portion 15 will rotate to the second position. While the biasing member is described herein as a coil spring, those of ordinary skill in the art will recognize that other biasing members may be used to bias the buckets 14 in a desired orientation. For example, a bungee cord or other elastic members may be used as a biasing member.

Figure 7:
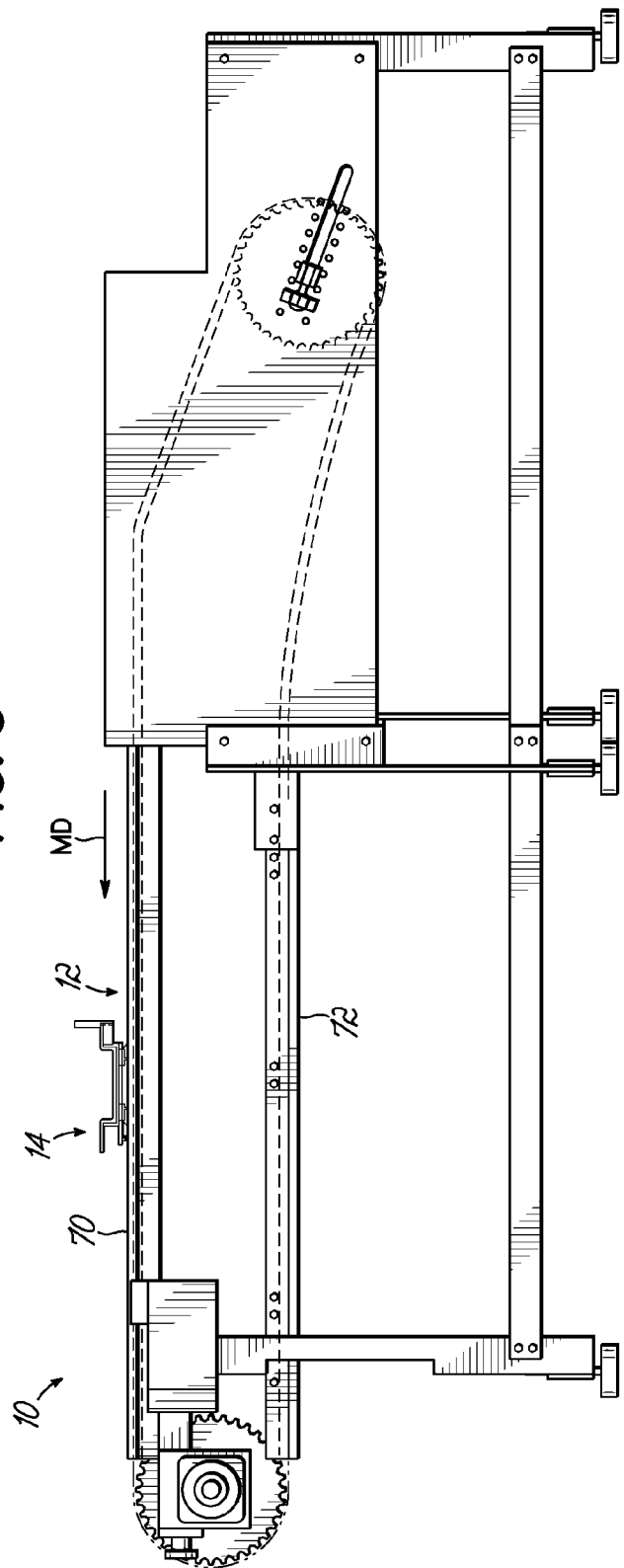
FIG. 7 is a side elevation view of the tissue handling apparatus shown in FIG. 1.

The buckets 14 cooperate with bucket conveyor 12 to selectively rotate the bucket portion 15 between the first and second positions, as needed for packaging a clip in a flat carton. As shown in FIG. 1 and FIG. 7 of the present application, the bucket conveyor 12 includes an active path 70 and a return path 72. Along the active path 70, the tissue clips are loaded into the buckets 14 and are delivered to and packaged in the appropriate cartons. The return path 72 returns the buckets 14 to the beginning of the active path 70 so that the handling apparatus 10 may run as a continuous-type system.

Figure 6:
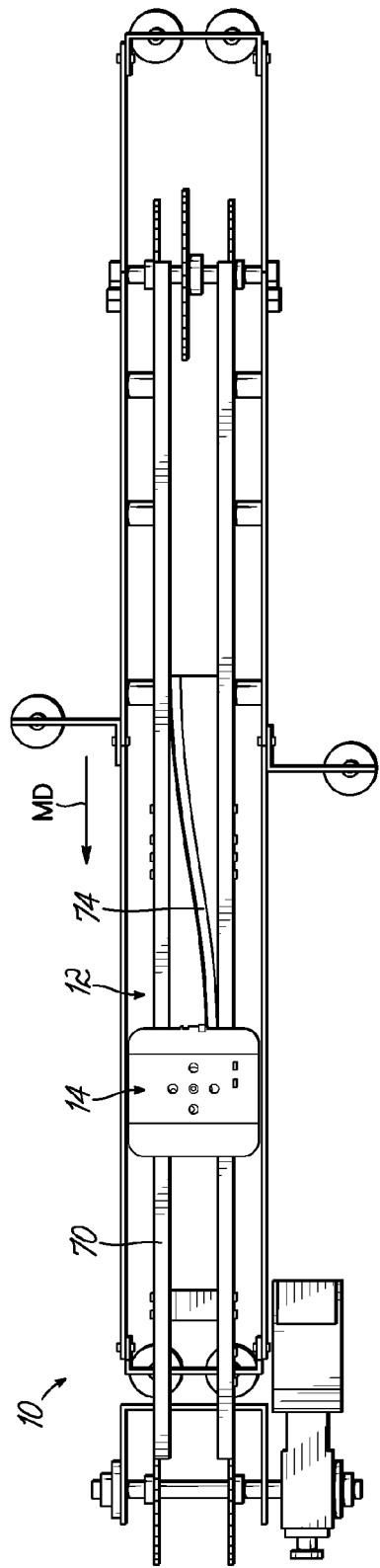
FIG. 6 is a top plan view of the tissue handling apparatus shown in FIG. 1.

As shown in FIG. 6, the handling apparatus 10 includes a first cam surface 74 adapted to engage bearing surface 52 on cam follower 48. The first cam surface 74 is configured such that as the bearing surface 52 engages first cam surface 74, the actuating lever 42, and thus the bucket portion 15, is rotated relative to bucket support 30 from the first position with the channel transverse to the machine direction, to the second position with the channel extending in the machine direction. First cam surface 74 may be positioned along bucket conveyor 12 when the tissue clip is being placed in the channel 20 of bucket portion 15 and ends (i.e., is in the first position) prior to rotation of the clip and bucket for pushing the clip into the flat carton as previously described.

The handling apparatus 10 further optionally includes a second cam surface (not shown) on the return path 72 adapted to engage bearing surface 52 on cam follower 48. In a similar manner, the second cam surface is configured such that as the bearing surface 52 engages the second cam surface, the actuating lever 42, and thus the bucket portion 15, is positively rotated relative to the bucket support 30 from the second position to the first position. The second cam surface may be positioned such that the bucket portion 15 is in the first position prior to the tissue clips being positioned in the buckets 14 for boutique packaging.

As recognized by those of ordinary skill in the art, because the bucket 14 is spring biased toward the first position, a cam surface along the entire travel path (active and return paths) of the bucket conveyor 12 is not required. Due to the spring, once the buckets are in the first position, there is no need to have any cam surface to keep the buckets 14 in the first position. However, the spring biasing also requires that when it is desired to have the buckets 14 in the second position, the bearing surface 52 must engage a cam surface to maintain the bucket 14 in the second position against the spring bias. Otherwise, the bucket 14 would return to or remain in the first position due to the action of the spring. Thus as described above, a cam extends along the travel path of the buckets preferably only where it is desired to have the buckets in the second position.

Those of ordinary skill in the art will recognize many alternative designs that are within the scope of the invention. For instance, the biasing of the buckets in a preferred orientation, such as by use of the coil spring 58, may be eliminated and a cam surface may extend the entire travel path of the buckets to accomplish the rotation of the buckets between the first and second positions. In yet another design, the coil spring 58 may be eliminated and the buckets may include a spring-loaded detent associated with bucket portion 15 and two recesses associated with bucket support 30 such that when the detent is engaged with one of the recesses, the bucket is in the first position and when the detent is engaged with the other recess, the bucket is in the second position. Because the detent is spring loaded, only a sufficient force acting on the bucket will rotate the bucket between the first and second positions. Additionally, when the bucket reaches the first and second position, there is no longer a need to apply a force to keep the bucket in a respective position. Thus, a cam surface does not have to extend along the travel path for the entire time a bucket is in a certain orientation, as is the case for the embodiment described above. In this design, a cam surface must be provided only when rotating between the first and second positions. Once the buckets are in the first or second position, a cam surface does not need to be provided as the spring biasing maintains the bucket in the desired orientation. Those of ordinary skill in the should also recognize that instead of a biasing member to bias the bucket in the first position, a frictional fit may exist between the pin 50 and the arcuate slot 38 so as to prevent any undesired rotation of the bucket portion 15 relative to the bucket support 30 unless a sufficient force acts upon the bearing surface 52.

Figure 8A:
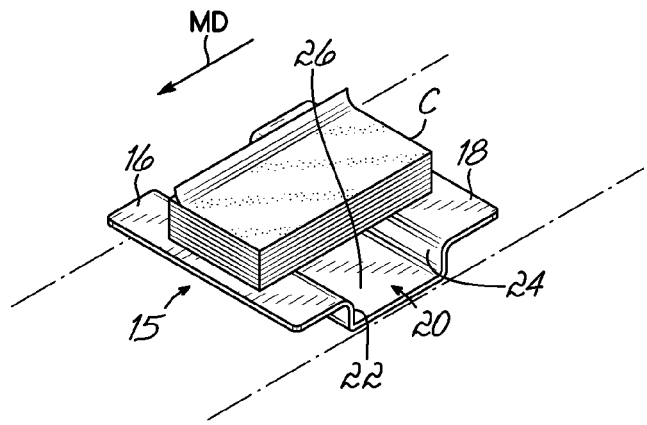
FIG. 8A is a perspective view of the bucket orientation when it receives tissue clips for packaging in boutique cartons.

Operation of the handling apparatus 10 of this first embodiment will now be described. When it is desired to package the clips in a boutique carton, the buckets 14 are in the default, spring-biased first position so that when a clip is positioned in the bucket 14, the clip spans the transverse channel 20 as shown in FIG. 8A of the present application. The handling apparatus 10 is configured such that the buckets do not require any rotation of the clip in order to be packaged in the boutique carton, as described in more detail below. When it is desired to package the clips in a flat carton, however, the handling apparatus 10 must be configured to rotate the buckets 14 for receipt of the clips in channel 20. Specifically and as noted above and in the '392 patent, it is most desirable to insert the clips endwise into flat cartons. Since the clips are initially moved lengthwise in a downstream direction, however, it is necessary to turn the clips 90 degrees so that they can be pushed transversely out of the buckets in an endwise direction at the cartoner to load the flat cartons.

Figure 8B:
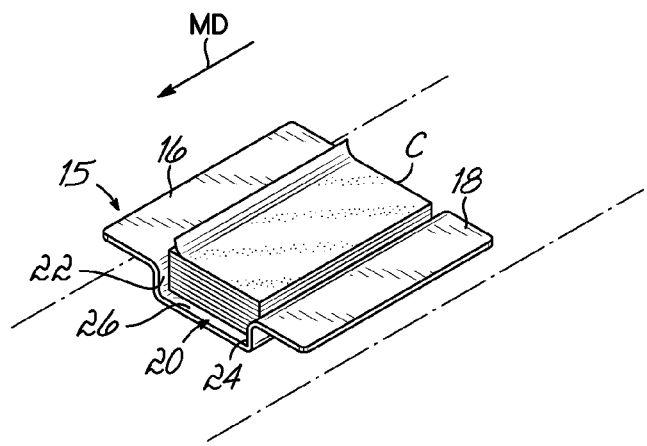
FIG. 8B is a perspective view of the bucket orientation when it receives tissue clips for packaging in flat cartons.

In order to accommodate this reorientation of the clips, a cam is positioned along the bucket conveyor 12. Note that the cam may be added as a changeover part or may be automated, such as with a pneumatic cylinder, to be properly positioned along bucket conveyor 12. The buckets 14 from the return path 72 engage the cam surface to rotate the buckets 14 from the first position to the second position thereby having the transverse slot substantially parallel to the machine direction. The buckets 14 enter the active path 70 in this orientation and the tissue clips are loaded into the channels 20 of buckets 14 while in the second position. More particularly, the clips are loaded in buckets 14 so as to be located within the channel 20 as shown in FIG. 8B of the present application. After loading the clips in the buckets 14, the buckets 14 disengage from the first cam surface 74. The spring bias rotates the buckets 14 from the second position back to the first position. In the first position, the buckets 14 are oriented so that the clips in the transverse channel 20 may be pushed endwise into the flat boxes transversely to the machine direction MD. After the clips are pushed from the buckets 14, the buckets are carried back along the return path 72 to repeat the process.

Alternately, the bucket rotation is fully cam controlled by one or more cams.

Figure 9:
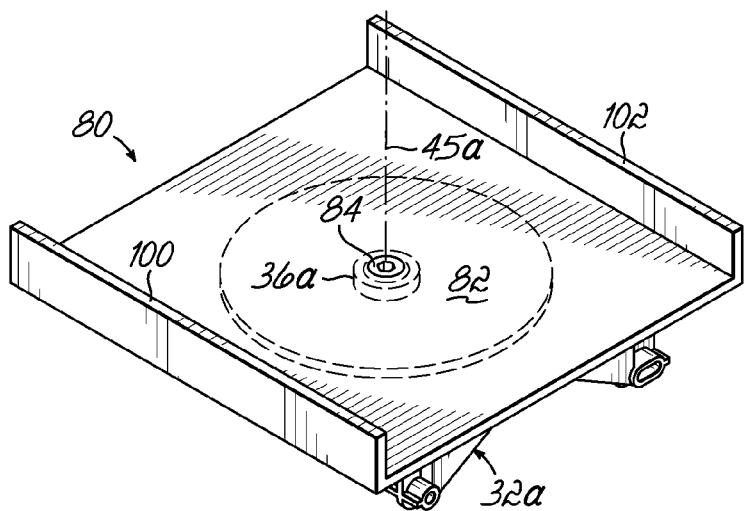
FIG. 9 is a perspective view of a second embodiment of the invention including a bucket having a flat bottom.
Figure 10:
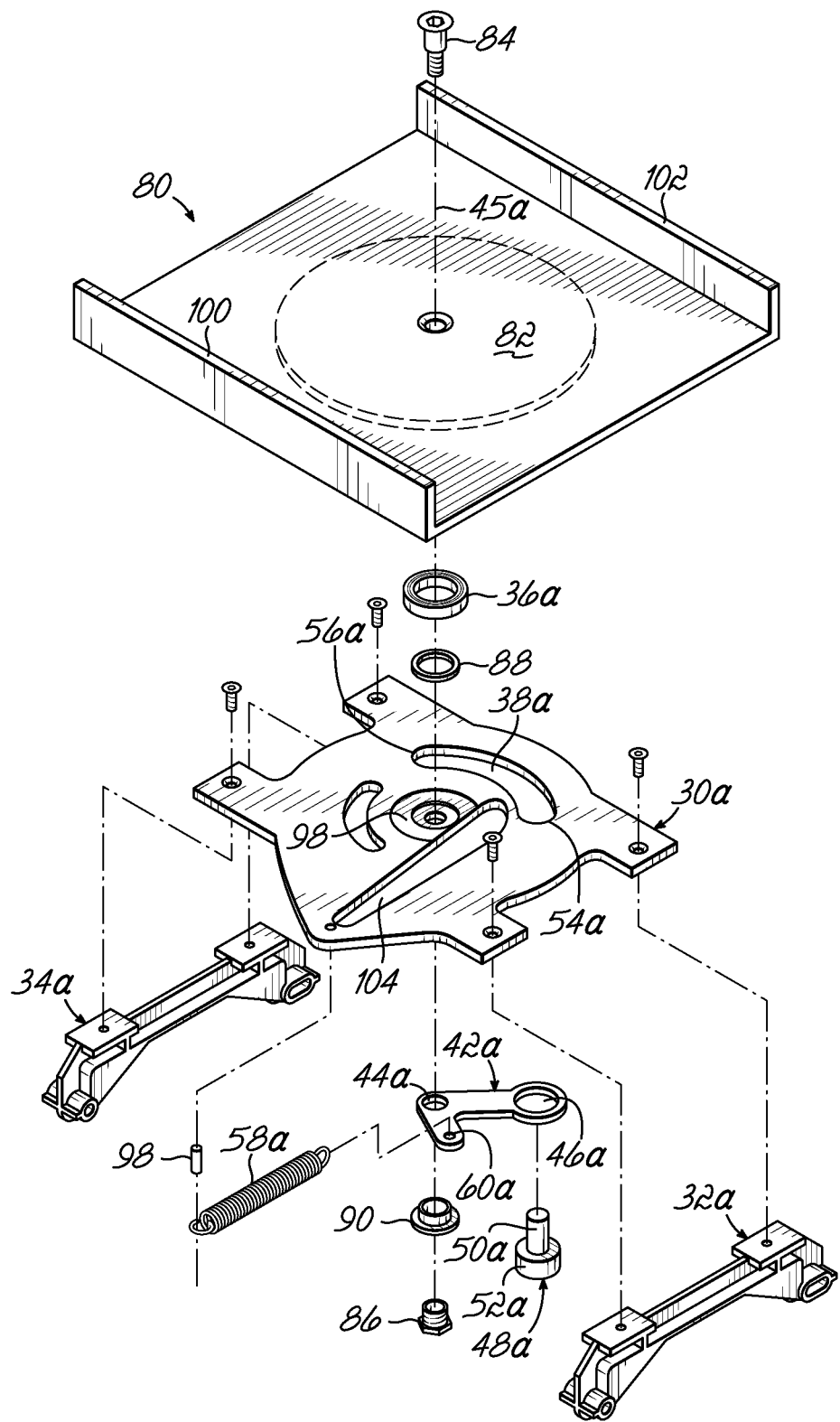
FIG. 10 is an exploded view of the embodiment of FIG. 9.

The details of further packaging the clips in the boutique or flat boxes in the present invention are similar to that disclosed in the '392 patent. In particular, as shown in FIGS. 9 and 10 of the '392 patent, a cartoner includes a carton feeder, such as flat carton feeder FCF, for feeding cartons onto a carton conveyor, the lugs of which are illustrated in FIGS. 9 and 10 of the '392 patent. As shown in FIG. 9 of that patent, a lug set engages erected flat cartons and moves them in the downstream direction or machine direction. FIG. 9 of the '392 patent will be described in this connection as illustrating the loading of the flat cartons with flat clips.

Figure 11:
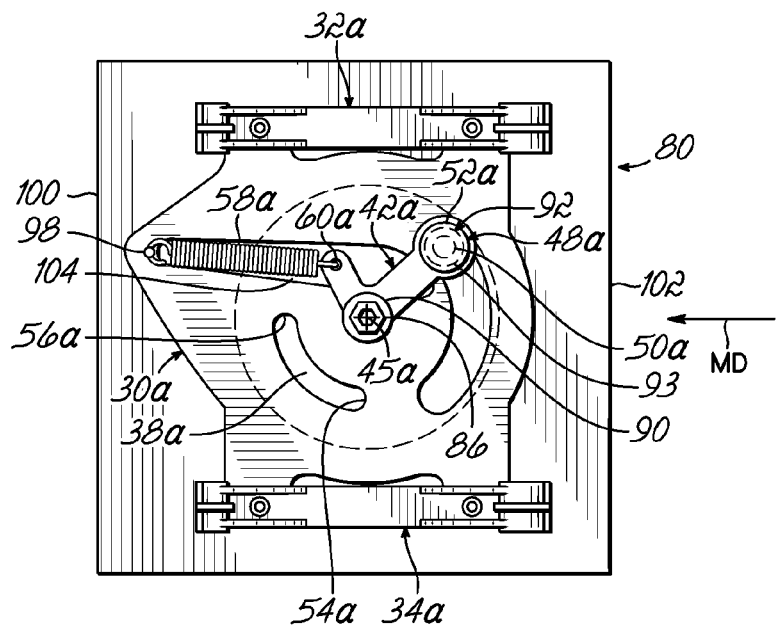
FIG. 11 is a bottom plan view of the embodiment of FIGS. 9 and 10.
Figure 12:
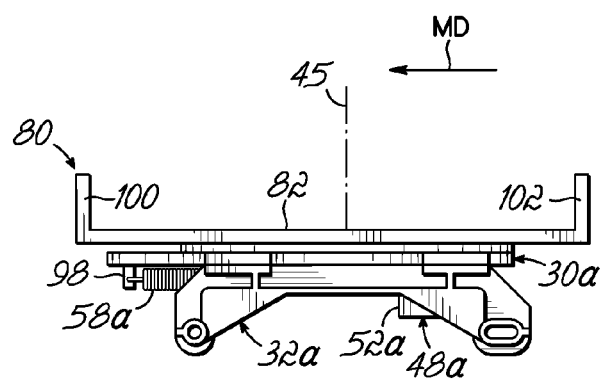
FIG. 12 is a side elevational view of the embodiment of FIGS. 9-11.
Figure 13:
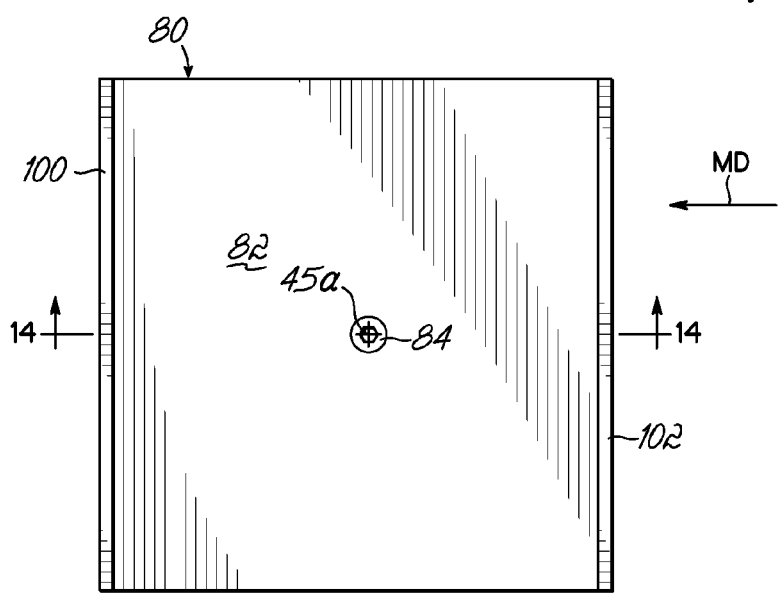
FIG. 13 is a top plan view of the embodiment of FIGS. 9-12.

It will be appreciated that the cartoner also includes a transfer guide bucket conveyor having a plurality of transfer guide buckets. This transfer guide bucket conveyor is elongated in the machine direction and is interposed between the bucket conveyor and carton conveyor. The construction of these transfer guide buckets is perhaps best seen in FIGS. 11, 11A and 11B of the '392 patent. Each transfer guide bucket has two opposed sidewalls which converge toward a discharge end from a wider receiving end. Each of the guide buckets is mounted on two brackets comprising the guide of the transfer guide bucket conveyor.

It will be appreciated that the transfer guide bucket conveyor as disposed in the cartoner apparatus has only a limited operational run, as diagrammatically indicated in FIG. 3 of the '392 patent. This transfer guide bucket conveyor is disposed between the carton conveyor on the one side and the bucket conveyor on the other, so that clips, which are pushed from the buckets on the bucket conveyor, are moved transversely through the guide buckets and into the cartons. In this regard, it will be appreciated that the bucket channels are indexed and aligned with the transfer guide buckets and that the floors of the buckets are in preferably the same plane as the floors of the transfer guide bucket.

It will also be appreciated that the carton conveyor is provided in a standard or other desirable pitch such as twelve inches, however, it will be appreciated that that pitch is defined by the lug sets. In any event, the bottom panel of the carton is disposed in about the same plan and level as the floors of the transfer guide bucket and floor of the channel of the buckets.

It will also be appreciated that the lug sets are on a similar pitch with respect to each other, but that the distances between the lug sets may vary, one to accommodate one particular width of a flat carton, for example, and the other to accommodate the particular leading to trailing edge width of a boutique carton.

Accordingly, it will be appreciated that the bucket conveyor and the transfer guide bucket conveyor are driven by drives which are controlled by independent servo drives with respect to the carton conveyor so that the appropriate phase alignment can be made when the machine is selectively switched from handling flat clips to boutique configured clips.

Also, it will be appreciated that the loading of the clips into the cartons as shown in FIG. 9 of the '392 patent is accomplished by a conventional barrel loader having disposed on the ends of its pushers a U-shaped pusher. This pusher moves in a load direction to push the clips from the floors of the channels through the transfer guide buckets, across their floors and into the cartons as illustrated in FIG. 9 of the '392 patent.

Thereafter, the barrel loader withdraws the pushers and the filled cartons are moved downstream for flap gluing, closing, and other finishing steps and discharge.

It will be appreciated that the clips are preferably compressed as they enter the cartoner and are prepped for transport into the cartons. Flat confiners or tampers are shown in this regard in the drawings of the '392 patent. For example, as shown in FIG. 9A of the '392 patent, a confiner or tamp which may be mounted on an overhead carousel, for example, descends via means of a cam driven track, for example, onto the clip, confining and compressing it in the channel.

This confiner may be elongated so that it extends along the full length of the clip lying transversely across the bucket. This confiner may also extend into or over the guide bucket as illustrated in FIG. 9B of the '392 patent, however, the confiner stops short in a transverse direction from the cartons. Thereafter, the confiners are lifted upwardly and away, where they are moved through a return run and back toward an entry end of the cartoner.

Accordingly, as shown in FIG. 9A of the '392 patent, a confiner is moved downwardly and which also continues to move in machine direction MD to compress and confine the flat clip before and while it is being pushed with the U-shaped pusher which does not interfere with the confiner transversely through the transfer guide bucket conveyor and into the carton.

FIG. 9B of the '392 patent illustrates the continuing influence of the confiner on the clip as it is pushed through the guide bucket and into the carton.

Turning now to FIG. 10 of the '392 patent, it will be appreciated that this figure illustrates the packaging of a clip in a boutique carton or container by first configuring the clip into a boutique shaped clip. In FIG. 10 of the '392 patent, it will be appreciated that a boutique carton feeder (BCF) has fed cartons onto the carton conveyor, the cartons being driven by the sets of carton conveying lugs at an appropriate pitch, and that the transfer guide bucket conveyor and the bucket conveyor has been phased by means of an appropriate servo drive into appropriate registry with the cartons, all of which move downstream and in a machine direction. Of course, it would be possible to provide a line drive machine, where the various phases are mechanically adjusted, however, the servo drive mechanisms for the various conveyors have been found to easily produce the phase registries that are required between the components.

As shown in FIG. 10 of the '392 patent, the clip lies or spans across and over the channel and is supported by the rear and forward floor of the buckets. An elongated confiner or tamp, which has been substituted for the tamp used for flat cartons, is utilized to initiate and hold the clip in a U-shaped configuration partially at least down into channel. The confiner is not as wide in the machine direction as the confiner for the flat carton and, when moved downwardly as illustrated in FIG. 10A of the '392 patent, pushes the clip downwardly into the channel of the bucket, so that the clip takes on a U-shaped configuration. This shape may be more steeply inclined than as shown in FIG. 10A of the '392 patent when the tamp compresses the bight of the clip.

As the side of the clip is engaged by the U-shaped pusher, the clip is pushed transversely out of the channel in a load direction into the transfer guide buckets, the floors of which are preferably co-planar with the floors of the bucket channels.

The confiners or tamps are elongated so they extend over the transfer guide bucket and the confiners are carried on the horizontally moving carousel described above, for example, with the confiners being raised and lowered by an appropriate cam track, just as the confiners with respect to FIG. 9 of the '392 patent. The confiners extend laterally or transversely in a load direction into the area of the transfer guide buckets and thus hold and maintain the clips in a U-shaped configuration, somewhat pressing the bight or intermediate portion of the clip into the channel and into the respective guide buckets as the clip is pushed.

The inwardly tapered walls of the transfer guide buckets serve to further confine and shape the boutique clips into the appropriate final configuration for loading into the cartons as illustrated in FIG. 10 of the '392 patent as the buckets, the cartons and the guide buckets move from right to left as shown in this figure.

The pushers are mounted on and actuated by a barrel loader of any conventional design, such that the pushers are moved in a load direction as shown in FIG. 10 of the '392 patent, transversely of the buckets and the transfer guide buckets to push the clips into the boutique cartons in a bent or U-shaped configuration.

Accordingly, it will be appreciated that the clips are urged downwardly and at least partially into the channels to provide and accommodate their boutique configuration for loading into the cartons. Thereafter, the barrel loader withdraws the pusher and the confiners are raised, both to operate through return runs for further engagement, as the machine continues in operation.

Alternate Embodiment

In another embodiment of the invention, and referring to FIGS. 9-15, a bucket 80 having a flat floor surface 82, comprising a product support surface, is provided. This product supporting bucket may have many varied floor configurations, either preferably flat or in any other shape, not limited to having a transverse, product receiving channel. As shown in these Figures, the bucket floor 82 of this embodiment comprises a relatively flat product receiving surface.

Except for the channel-shaped buckets 14 of the prior embodiment, and any further description noted below, the remaining structural elements of this embodiment, together with the turning operation of the bucket 80, are similar to those for that bucket 14 described above, with similar parts designated by similar numbers together with a suffix "a" thereon in FIGS. 9-15.

Products are deposited on bucket 80 and floor 82 thereof. Pre- or post-bucket rotation is generated, both to receive and/or turn products thereon to a desired orientation for processing or packaging. The buckets 80 can be provided with a plurality of features to facilitate or enhance product reception or orientation initially or through the process and where desired, but this embodiment is not limited to any particular bucket floor or product receiving surface.

With further attention to the structural details of the second embodiment, it will be appreciated that a pin 84 is secured by nut 86 as a fixed pivot pin for rotation of bucket 80. Pin 84 is fixed against rotation to plate 30a. Bearing 36a has an outer race (see FIGS. 14, 15) preferably pressed into bucket 80 and an inner race preferably pressed about pin 84. A spacer bearing 88 is secured between bucket 80 and plate 30a, while bushing 90 serves to position arm 42a about pin 84 and turns about axis 45a, allowing rotation of arm 42a with respect to plate 30a when follower 48a is driven by a cam to rotate bucket 80.

Figure 15A:
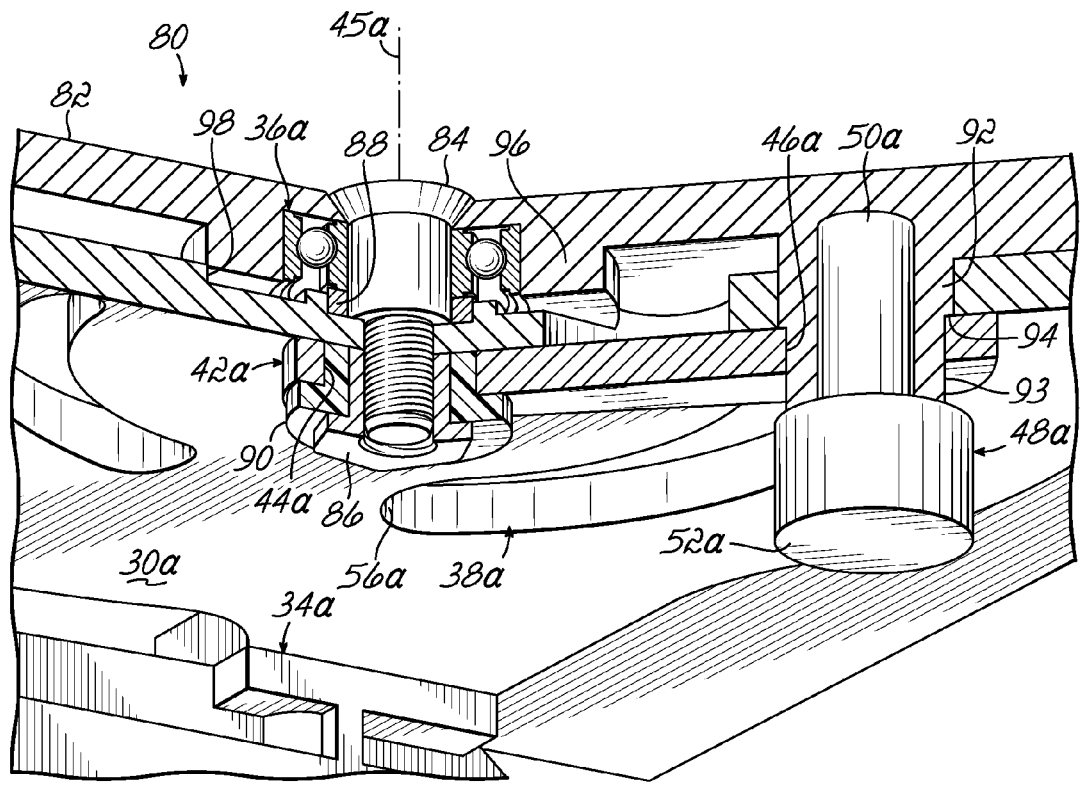
FIG. 15A is a perspective sectional bottom view of the embodiment in FIGS. 14, 15.

In this embodiment (FIG. 15A), as well as in the first embodiment, a boss 92 (with like numbers being used) extends downwardly from bucket 80 and defines a shoulder 94 facilitating connection of bucket 80 to arm 42a, as well as providing a receptor for pin 50a. In this embodiment, boss 92 extends into slot 38a (38) and moves therein. Alternately, the boss 92 could be fore-shortened so pin 50a would have a diameter closer to the width of slot 38a and be captured therein.

Figure 14:
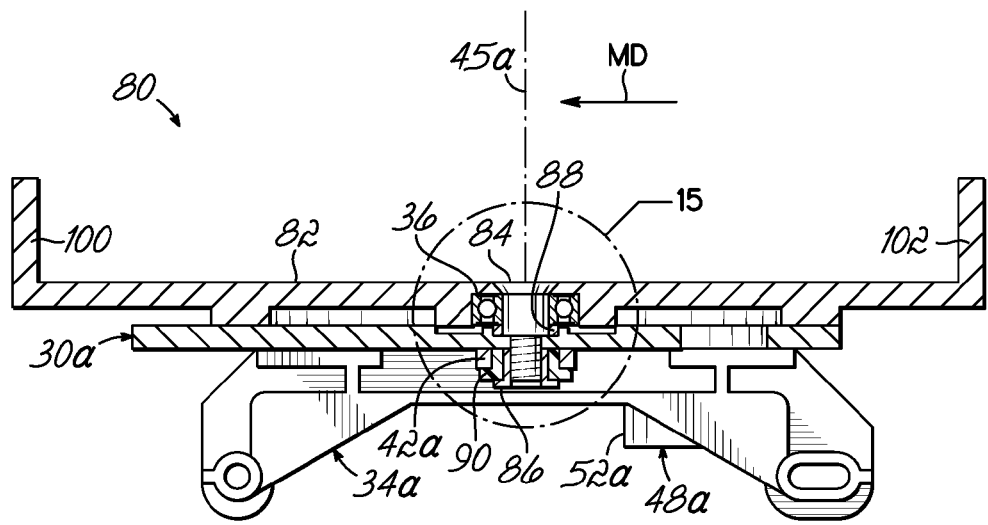
FIG. 14 is a cross-sectional view taken along line 14-14 of FIG. 13 of the embodiment of FIGS. 9-13.
Figure 15:
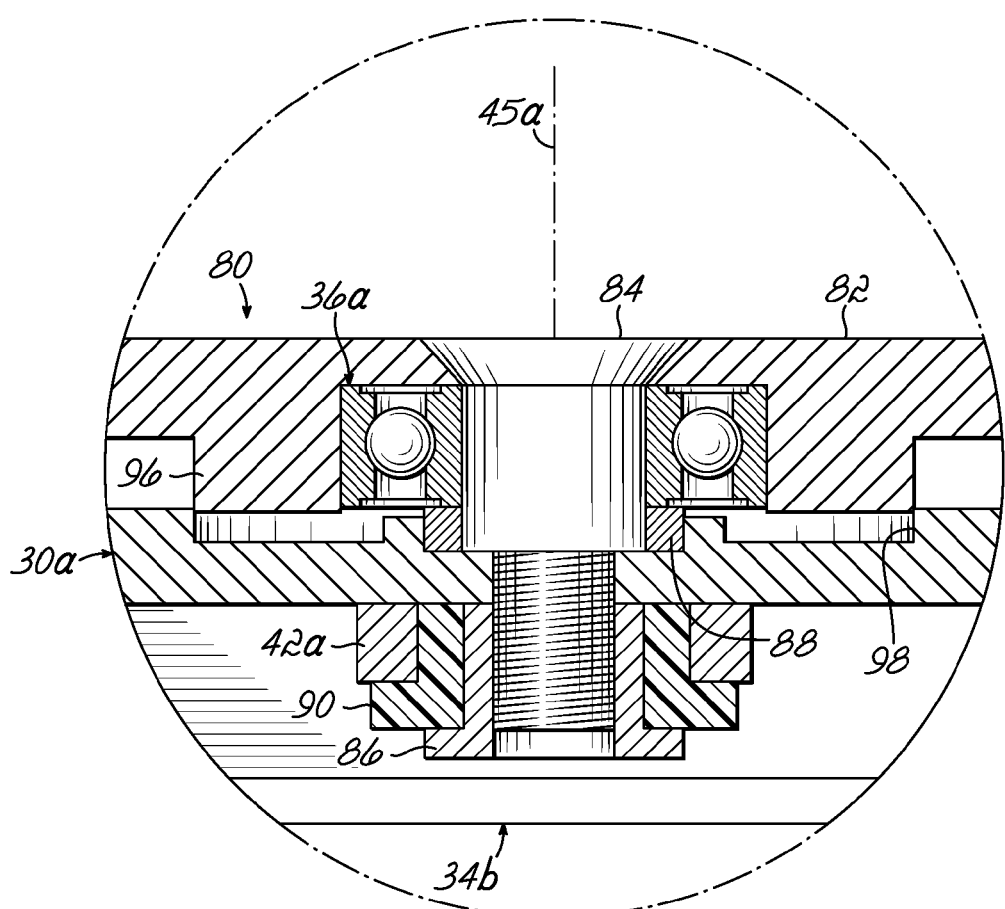
FIG. 15 is a detailed cross-sectional view of the encircled area of FIG. 14.

Moreover, a boss 96 extends downwardly from bucket 80 into a circular recess 98 in plate 30a to facilitate rotational position of bucket 80 on plate 30a (see FIGS. 14, 15). Similar structure can be used in the first embodiment as well.

Bucket 80 differs from bucket 14 and instead of a channel, has a relatively flat floor 82. Bucket 80 preferably has leading and trailing walls 100, 102 defining edges of floor 82, but could be otherwise configured.

Slot 104 accommodates spring 58a.

Accordingly, bucket 80 is rotatable about axis 45a when driven by arm 42a and follower 52a as the bucket is moved along a conveyor path. In one position, leading and trailing walls 100, 102 are transverse to the conveyed machine direction. When the bucket 80 is in another rotated position, walls 100, 102 are parallel to the machine direction.

Products on bucket 80, bucket floor 82, are thus received thereon and are transferred and/or turned as desired for processing, packaging or the like.

Tissue clips and other products can be processed, conveyed, oriented and transferred in this second embodiment as desired, and with the same advantages as the previously described embodiment.

It should be appreciated that with all embodiments disclosed herein, the products, including but not limited to tissue clips, can be introduced onto the buckets from a variety of approach angles, such as parallel to or transversely to the bucket conveyor machine flow direction, or from above the buckets from any direction. The buckets are positioned to a desired rotational orientation for receiving the products, then can be rotated, where desired, to rotate the product for further processing or packaging. Preferably tissue clips are fed endwise, with the narrower end loading, from all the approach directions. Bucket rotation for receiving and transferring the clips for desired packaging facilitate a variety of packaging configurations as will be appreciated.

Additionally, it will be appreciated that a variety of mechanisms or devices in place of the described actuating arm and cam follower could be used to rotate the buckets. For example only, the buckets could be rotated by electromagnetic, pneumatic, hydraulic or other forms of devices sufficient to rotate the buckets.

It will be appreciated that in the past, rotatable product support plates have been used to orient products for translation in a conveyor. Such a prior device is shown, for example, in U.S. Pat. No. 6,435,332. The structure of the components of that device, however, are quite different from that of both the first and second embodiments of this invention, however, as are readily ascertainable from these descriptions and the claims herein.

And finally, for purposes of this application, a variety of any suitable expedients can be used for rotating the buckets, i.e. product receiving members between first and second positions. These expedients or means for rotating include the cam and cam follower structures disclosed in the drawings. They also include other forms of cams and cam followers as well as other devices such as electronic, magnetic or pneumatic driver structures, solenoids or the like and any device capable of selectively turning the buckets or members to positions ad described herein.

Operating modes of the invention are variable.

It will thus be appreciated this invention contemplates at least two bucket embodiments and is capable of receiving, transferring and orienting clips of tissue in a variety of methods or modes, including those discussed below:

1. First Embodiment—Boutique: Flat clips are fed in an MD direction, narrow end leading, onto a bucket (first position) with clips spanning a transverse bucket channel. Clips are pushed from above downwardly into the channel into a "U"-shape for transverse loading into boutique cartons.

2. First Embodiment—Flat: Clips are fed in an MD direction, narrow end leading, toward buckets which have been rotated (second position) so their bottom channels extend also in an MD direction. The clips are deposited into the channels and the buckets are then turned so the channel is perpendicular to the MD direction from where the flat clips are pushed in a direction transversely to the MD direction into flat cartons.

3. First Embodiment—Boutique—Side Feed: flat clips are fed, narrow end leading, in a direction perpendicular to machine direction MD and to buckets (second position) having a transverse channel. The clips span the channel, the buckets are turned so the channels are oriented perpendicular to the MD direction and packaging proceeds as in Mode 1 above.

4. First Embodiment—Flat—Side Feed: flat clips are fed, narrow end leading, in a direction perpendicular to direction MD. The clips are deposited into the transverse channels of buckets (first position) and transfer continues with clips being pushed transversely into flat cartons.

5. Second Embodiment—Boutique: flat clips are fed in an MD direction, narrow end leading, onto flat bottom buckets, are tamped intermediately to initiate a "U"-shaped configuration, and are pushed transversely into boutique cartons.

6. Second Embodiment—Flat: flat clips are fed in an MD direction, narrow end leading, onto flat bottom buckets in one position. The buckets are turned so the clips are re-oriented with broad side leading and the clips are pushed transversely, narrow end leading, into flat cartons.

7. Second Embodiment—Boutique—Side Feed: flat clips are fed, narrow end leading, in a direction perpendicular to a direction MD onto flat bottom buckets. The buckets are turned so the clips are re-oriented, narrow end leading, in a direction MD. Packaging proceeds as in Mode 5 above.

8. Second Embodiment—Flat—Side Feed: flat clips are fed, narrow end leading, in a direction perpendicular to a direction MD. From there, the clips can be pushed transversely, narrow end leading, into flat cartons.

Other modes of operation will be appreciated, and the invention thus provides a single transfer apparatus having multiple modes of flat and boutique tissue packaging.

While the present invention has been illustrated by a description of various preferred embodiments and while these embodiments have been described in some detail, it is not the intention of the Applicant to restrict or in any way limit the scope of the appended claims to such detail. For example, while the above description of the invention was directed to the packaging of tissue clips, those of ordinary skill in the art will recognize that the invention may be used in the packaging of nearly any item where it is desirable to change the orientation of the item. Such a change in orientation may be desirable to mate a manufacturer's production line with various packaging machines. The various features of the invention may be used alone or in numerous combinations depending on the needs and preferences of the user. Thus, additional advantages and modifications will readily appear to those skilled in the art and without departing from the scope of this invention and applicant intends to be bound only by the claims appended hereto.

What is claimed is:

1. Product handling apparatus for receiving products and for transferring received products selectively into differing configurations suitable for packaging; said apparatus comprising:

a plurality of rotatable product receiving members selectively moveable in a first direction between two locations;

a first one of said locations oriented proximate a product feed apparatus, in which said location the receiving member is oriented to receive product from said feed apparatus and another second one of said two locations oriented proximate a product cartoning apparatus in which other location of said product receiving member, products are removed therefrom and transferred into a carton;

a plurality of product receiving member supports mounted for movement in a first direction;

said product receiving members being rotatably mounted on respective member supports for selective rotation of said product receiving members between first and second positions in each of said first and second locations to selectively receive said products when in either of said first and second positions at said first location and for presenting said products selectively in either of said first or second positions at said second location for cartooning;

said product receiving member receiving products at said first location for transfer for cartooning and, without turning said member for transferring said products downstream from said first location to said second location for cartooning at said second location;

said product receiving member receiving products at said first location for transfer for cartooning, and moveable for transferring products downstream from said first location to said second location for cartooning, said product receiving member selectively rotatable for turning said products prior to cartooning at said second location to selected one of said first and second positions.

2. Apparatus as in claim 1 wherein said plurality of product receiving members have product receiving floors.

3. Apparatus as in claim 2 wherein said floors are flat.

4. Apparatus as in claim 3 wherein said floors include a channel defined in and below said floor.

5. Apparatus as in claim 4 wherein said channels extend perpendicular to said first direction when said product receiving members are oriented in said first position.

6. Apparatus as in claim 5 wherein said channels extend in said first direction parallel to said first direction when said members.

7. Apparatus as in claim 2 further including means for selectively rotating said product receiving members when moved between said first and second positions.

8. Apparatus as in claim 7 wherein said means for rotating including a cam follower and a cam surface, one of which is operably connected to said product receiving member for rotating said member when said cam follower and said can surface are operably engaged.

9. Apparatus as in claim 8 wherein said cam follower is connected to said member and said cam surface is movably mounted for selective engagement therewith.

10. Apparatus as in claim 1 wherein said product receiving members comprise buckets and further including a bucket conveyor on which said supports and buckets are mounted.

11. Apparatus as in claim 10 wherein said conveyor includes said member supports.

12. Apparatus as in claim 11 wherein said first direction is a machine direction for said conveyor and said receiving members comprise transverse channels selectively disposed transversely or parallel to said machine direction when said buckets are in said first position, and said channels are selectively disposed in parallel or perpendicularly to said first direction when said buckets are rotated into said second position.

13. Product handling apparatus for receiving products and for transferring received products selectively into differing configurations suitable for packaging; said apparatus comprising:
a plurality of rotatable product receiving members selectively moveable between two positions;
a plurality of product receiving member supports mounted for movement in a first direction;
said product receiving members being rotatably mounted on respective member supports for selective rotation of said product receiving members between first and second positions to selectively position said products for transfer in different configurations; and
said apparatus further comprising a member rotation limit apparatus, comprising:
an arcuate slot formed in said member support, said slot having a first end and a second end;
a cam follower coupled to said member such that movement of said cam follower moves said member relative to said support;
said cam follower having a pin that projects through said arcuate slot and traversing said slot as the member rotates between said first and second positions relative to said support;
wherein when said member is in the first position, said pin engages said first end of said slot and when said bucket portion is in said second position, said pin engages said second end of said slot.

14. The bucket assembly of claim 13 further comprising:
a biasing member, said biasing member applying a force between said member and said member support said force biasing the member toward said first position.

15. A bucket apparatus for product handling and for receiving products and for configuring the products selectively for insertion into flat or boutique cartons, comprising:
a bucket portion having a bucket floor;
a bucket support adapted to be coupled to a bucket conveyor for moving the bucket portion along a machine direction;
wherein said bucket portion is pivotally coupled to said bucket support so as to permit selective rotation of said bucket portion relative to said bucket support, said bucket portion having a first position relative to said bucket support, said bucket portion having a second position relative to said bucket support;
said bucket portion being selectively oriented in either of said first and second positions;
said bucket portion moveable in a downstream direction from a product receiving location to a product cartoning location; and
a cam follower coupled to said bucket portion such that movement of said cam follower moves said bucket portion relative to the bucket support and selectively between said first and second positions at said product receiving location;
said bucket conveyor operable to transfer said bucket portions downstream to a product cartoning location while said bucket portion is in a selected first position and when said bucket portion is in a selected second position.

16. Apparatus as in claim 15 including a transverse channel in and below said floor and extending in one direction when said bucket portion is in said first position.

17. Apparatus as in claim 16 wherein said channel extends in a second direction when said bucket is in said second position.

18. An apparatus for handling clips of tissue having a length and a width narrower than said length for selective packaging in flat or boutique configuration wherein tissue clips are deposited onto a tissue clip conveyor, said apparatus comprising:
a plurality of tissue clip receiving members defining in part the tissue clip conveyor moving in a first direction from a clip loading station to a clip discharge station;
said members having a channel therein transverse to said first direction;
said members being oriented in a first position with respect to said first direction such that said channel is selectively oriented substantially perpendicular to said first direction when receiving clips for packaging into boutique configuration and said members being selectively rotatable to a second position such that said channels in respective members are substantially parallel to said first direction for receiving flat clips within said channel when said flat clips are to be packaged in flat configuration;
said tissue clip conveyor moving said tissue clip receiving members downstream from said clip loading station to said clip discharge station both when said members are rotated between positions at said loading station and at said discharge station and when said members are not rotated from their first positions at the loading station.

19. Apparatus as in claim 18 wherein said receiving members are selectively rotatable to rotate said channels to an orientation perpendicular to said first direction after flat clips are received therein.

20. A product handling apparatus for receiving products and for configuring the products selectively for insertion into cartons, said apparatus comprising:
a bucket conveyor having a plurality of respective buckets thereon for conveyance in a machine direction;
said buckets each having a bucket floor;
a cam follower coupled to each of the buckets; and
at least one cam surface associated with said bucket conveyor, said cam follower selectively engaged by said cam surface to rotate the buckets between a first position and a second position for receiving products thereon when the products deposited on said buckets are to be transferred endwise transversely into flat cartons;
said cam surface being selectively movable so as to not engage said can followers when said products deposited on said buckets are to be configured for insertion sideways into boutique cartons; and
said bucket conveyor conveying respective buckets in said machine direction when said buckets are in both said first and second positions.

21. A tissue handling transfer apparatus for receiving elongated tissue clips in a machine direction and for selectively transferring and positioning the clips suitable for flat or boutique packaging in containers, said handling transfer apparatus comprising:
a bucket conveyor comprising a plurality of bi-level product buckets for receiving and transferring tissue clips having a predetermined length and width in a machine direction towards containers;

said product buckets each having a flat upper level at least as long as and as wide as the length of the tissue clips, and a lower level comprised of a transverse channel in said upper level and whose width is greater than the width of the tissue clips but less than the length of the tissue clips;

wherein the tissue clips are received on the upper level of said buckets with the length of said clips oriented in the machine direction spanning said transverse channel when packaging in a boutique container;

wherein the tissue clips for packing in a flat container are received in the transverse channel with the length of said clips oriented in the machine direction; and further including apparatus for selectively turning said buckets 90 degrees for positioning and orienting the clips within said transverse channel transverse to said machine direction for packaging flat packs of tissue, and for selectively leaving said buckets unturned for packaging boutique packs of tissue.

22. A tissue clip receiving and cartoning transport including:

a bucket conveyor comprising a plurality of buckets moveable in a machine direction from a tissue clip receiving location to a tissue clip discharge location, said buckets including a first channel, therein having an elongated clip supporting floor and second and third clip supporting surfaces disposed above, respectively along, and adjacent to said channel and parallel to said elongated clip supporting floor of said chanel, said buckets mounted for selective rotation between first and second rotational positions at said clip receiving locations and between said first and second rotational positions at said discharge location, in said first rotational position, said channel in said bucket being perpendicular to said machine direction and in said second rotational position, said channel being parallel to said machine direction whether said bucket is disposed at said clip loading location or at said clip discharge location.

23. A tissue clip transfer apparatus for receiving tissue clips in at least two configurations and for discharging tissue clips in at least two selected packaging configurations, said apparatus including:

a clip receiving bucket conveyor comprising a plurality of buckets thereon, said buckets being selectively rotatable into two positions for receiving clips when in either position at a clip loading station, and said buckets being selectively rotatable at a discharge location between said two positions, after transporting clips to said discharge location from said clip loading location, and for discharging clips for packaging in either one of said selected packaging configurations.

* * * * *

UNITED STATES PATENT AND TRADEMARK OFFICE
CERTIFICATE OF CORRECTION

PATENT NO. : 8,783,000 B2  
APPLICATION NO. : 12/567015  
DATED : July 22, 2014  
INVENTOR(S) : Jeffrey D. Wintring et al.

Page 1 of 1

It is certified that error appears in the above-identified patent and that said Letters Patent is hereby corrected as shown below:

In the Claims:

Column 16, lines 26-27, "cartooning" should be ---cartoning---.
Column 16, line 29, "cartooning" should be ---cartoning---.
Column 16, line 32, "cartooning" should be ---cartoning---.
Column 16, lines 33-34, "said product receiving member receiving products at said first location for transfer for cartoning, and moveable for" should be ---said product receiving products at said first location for transfer for cartoning at said second location, and moveable for---.
Column 16, lines 48-50, "Apparatus as in claim 5 wherein said channels extend in said first direction parallel to said first direction when said members." should be ---Apparatus as in claim 5 wherein said channels extend in said first direction parallel to said first direction when said members are rotated into said second position.---.
Column 16, line 55, "including" should be ---includes---.
Column 16, line 57, "can" should be ---cam---.
Column 17, line 39, after the word "support" insert --,--.
Column 18, line 54, "can" should be ---cam---.

Signed and Sealed this  
Twenty-eighth Day of June, 2016

Michelle K. Lee  
*Director of the United States Patent and Trademark Office*